United States Patent
Chen

(10) Patent No.: US 12,007,258 B2
(45) Date of Patent: Jun. 11, 2024

(54) FLEXIBLE CAPACITIVE TOUCH SENSING DEVICE AND HOD DEVICE

(71) Applicant: PixArt Imaging Inc., Hsin-Chu (TW)

(72) Inventor: Ching-Shun Chen, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 183 days.

(21) Appl. No.: 17/845,995

(22) Filed: Jun. 21, 2022

(65) Prior Publication Data
US 2023/0408299 A1 Dec. 21, 2023

(51) Int. Cl.
*G01D 5/24* (2006.01)
*B32B 5/02* (2006.01)
*B32B 7/12* (2006.01)
*B62D 1/04* (2006.01)
*B62D 1/06* (2006.01)
*H05B 3/34* (2006.01)

(52) U.S. Cl.
CPC .......... *G01D 5/24* (2013.01); *B32B 5/02* (2013.01); *B32B 7/12* (2013.01); *B62D 1/046* (2013.01); *B62D 1/065* (2013.01); *H05B 3/34* (2013.01); *B32B 2457/00* (2013.01)

(58) Field of Classification Search
CPC .... G01D 5/24; B32B 5/02; B32B 7/12; B32B 2457/00; B62D 1/046; B62D 1/065; H05B 3/34
See application file for complete search history.

(56) References Cited

U.S. PATENT DOCUMENTS

| 10,386,970 B2 * | 8/2019 | Harley | G06F 3/0447 |
| 10,459,585 B2 * | 10/2019 | Park | G06F 3/0443 |
| 2020/0356206 A1 * | 11/2020 | Pastwa | B60K 35/10 |

* cited by examiner

*Primary Examiner* — Giovanni Astacio-Oquendo
(74) *Attorney, Agent, or Firm* — Winston Hsu

(57) ABSTRACT

A flexible capacitive touch sensing device comprising a first, a second sensing region and a capacitance detection circuit. Each of the first, second sensing region comprises: flexible material; and electrodes, in or on the flexible material. Capacitance sensed by the capacitance detection circuit is used for detecting if an object causes capacitance variation to the first sensing region and the second sensing region. The first sensing region comprises a first side region with a first side which is adjacent to a second side of the second sensing region Shapes of the electrodes are changeable after provided on the flexible material. The electrodes are overlapped in normal directions of the first side region and the second side region. An angle which is not 0 degree exists between the electrodes which are overlapped. Such flexible capacitive touch sensing device can be applied to generate a HOD device with different sizes.

18 Claims, 8 Drawing Sheets

FLEXIBLE CAPACITIVE TOUCH SENSING DEVICE AND HOD DEVICE

BACKGROUND OF THE INVENTION

1. Field of the Invention

The present invention relates to a flexible capacitive touch sensing device and a HOD device, and particularly relates to flexible capacitive touch sensing device and a HOD device which have a plurality of independent sensing regions which can be combined to meet different requirements.

2. Description of the Prior Art

A conventional steering wheel may have a HOD (Hand Off Detection) function, which can prevent the driver from falling asleep or improving driving behavior while driving or assisting the driver in autopilot. However, steering wheels for different brands may have different sizes and structures, thus it is hard to design a general purpose HOD device.

Therefore, a new HOD device is needed.

SUMMARY OF THE INVENTION

One objective of the present invention is to provide a flexible capacitive touch sensing device which can be used to manufacture a general purpose HOD device.

Another objective of the present invention is to provide a HOD device which can meet different design requirements.

One embodiment of the present invention discloses a flexible capacitive touch sensing device, comprising a first sensing region, a second sensing region and a capacitance detection circuit. Each of the first sensing region and the second sensing region comprises: flexible material; and a plurality of electrodes, disposed in or on the flexible material, wherein the electrodes of the first sensing region and the second sensing region are electrically connected via conductive material or conductive components. The capacitance detection circuit is configured to sense capacitance caused by the electrodes. The capacitance is used for detecting if an object causes capacitance variation to the first sensing region and the second sensing region. The first sensing region comprises a first side region with a first side, and the second sensing region comprises a second side region. The first side is adjacent to the second side. Shapes of the electrodes of the first sensing region and the second sensing region are changeable after provided on the flexible material. The electrodes of the first side region and the second side region are overlapped in normal directions of the first side region and the second side region. An angle which is not 0° exists between the electrodes which are overlapped.

The above-mentioned flexible capacitive touch sensing device can be used in an HOD device. In such case, the flexible capacitive touch sensing device is provided between the covering material and the frame work. In another embodiment, the flexible capacitive touch sensing device is printed in or on the covering material.

In view of above-mentioned embodiments, the numbers of the sensing regions which are combined to form the flexible capacitive touch sensing device can be changed corresponding to the size of the frame work or any other requirements, thus the issues for the conventional steering wheel can be improved.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. The term "first", "second", "third" in following descriptions are only for the purpose of distinguishing different one elements, and do not mean the sequence of the elements. For example, a first device and a second device only mean these devices can have the same structure but are different devices. Besides, in following embodiments, a steering wheel is used as an example for explaining, but the concept disclosed by the present invention can be applied to any other device. For example, the concept disclosed by the present invention can be applied to a vehicle control device such as a gear lever of a car or a handgrip of a motorcycle.

Figure 1:
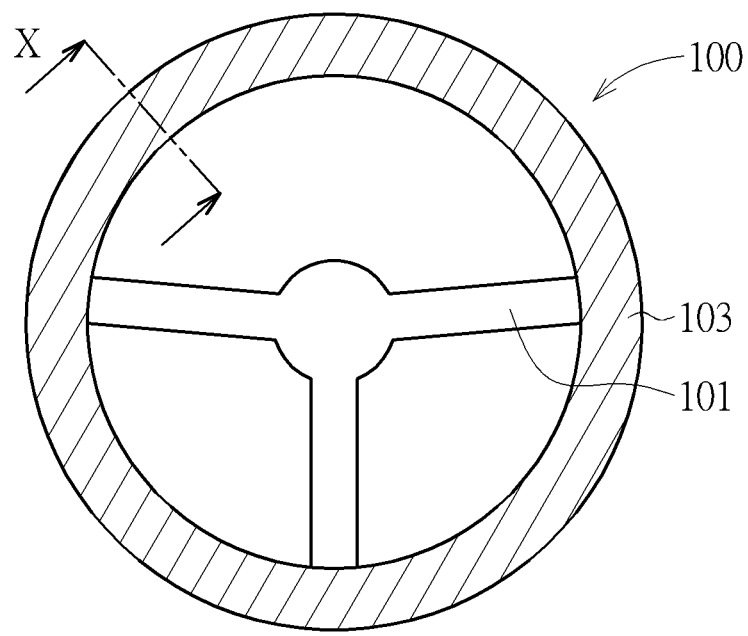
FIG. 1 is a schematic diagram illustrating a HOD device according to one embodiment of the present invention.
Figure 1:
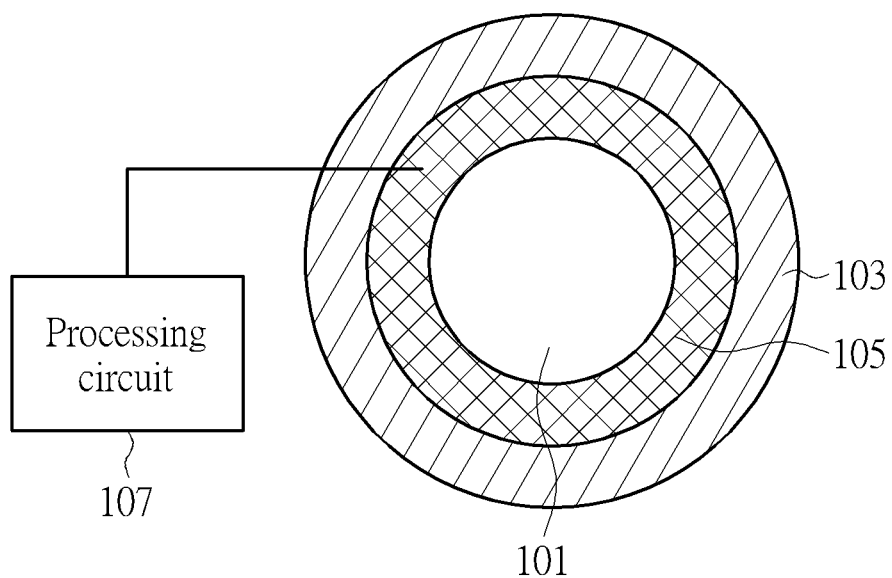

FIG. 1 is a schematic diagram illustrating a HOD device according to one embodiment of the present invention. The HOD device provided by the present invention comprises the steering wheel 100 and the processing circuit 107 illustrated in FIG. 1. The processing circuit 107 can be a processor of a vehicle which uses the steering wheel 100 or a circuit independent from the processor. In the upper diagram in FIG. 1, the steering wheel 100 comprises a frame work 101 and covering material 103. The lower diagram in FIG. 1 is a cross sectional diagram of the upper diagram in FIG. 1 following the X direction. As illustrated in the cross sectional diagram, a flexible capacitive touch sensing device 105 (or named a flexible capacitive touch sensing layer) is provided between the covering material 103 and the frame work 101. The covering material 103 can be leather, wood, carbon fiber or any other required material.

The flexible capacitive touch sensing device 105 outputs a first capacitance if a distance of a user's hand and the flexible capacitive touch sensing device 105 is larger than a predetermined distance, and outputs a second capacitance if a distance of a user's hand and the flexible capacitive touch sensing device 105 is smaller than the predetermined distance. In one embodiment, the predetermined distance is set as 0, therefore the flexible capacitive touch sensing device 105 outputs the first capacitance if the user's hand does not touch the steering wheel 100, and outputs a second capacitance if the user hand touches the steering wheel 100. Therefore, the processing circuit 107 can determine whether the user touches the steering wheel 100 or not according to the capacitance output by the flexible capacitive touch sensing device 105.

Figure 2:
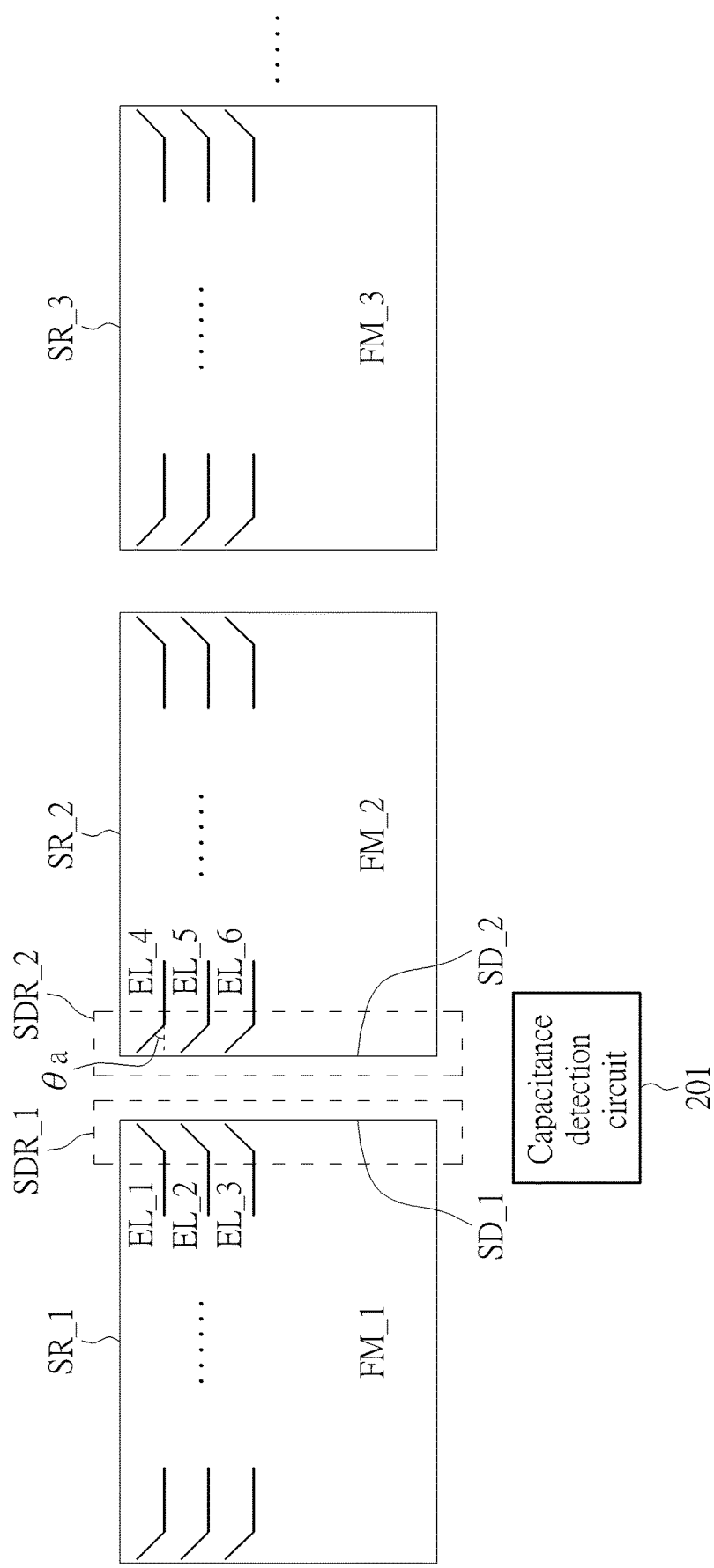
FIG. 2, FIG. 3, FIG. 4 and FIG. 5 are schematic diagrams illustrating flexible capacitive touch sensing devices according to embodiments of the present invention.

FIG. 2, FIG. 3, FIG. 4 and FIG. 5 are schematic diagrams illustrating flexible capacitive touch sensing devices according to embodiments of the present invention. In following embodiments, the flexible capacitive touch sensing device can comprise a plurality of sensing regions. In the embodiment of FIG. 2, only a first sensing region SR_1 and a second sensing region SR_2 are taken as examples for explaining, but the flexible capacitive touch sensing device provided by the present invention can comprise more than two sensing regions. Further, the flexible capacitive touch sensing device provided by the present invention can be applied to any other device rather than limited to a vehicle control device or a steering wheel. In such case, the flexible capacitive touch sensing device is configured to detect if an object causes capacitance variation.

As illustrated in FIG. 2, the flexible capacitive touch sensing device comprises a first sensing region SR_1 and a second sensing region SR_2. The first sensing region SR_1 and the second sensing region SR_2 respectively comprises flexible material FM_1, FM_2, and a plurality of electrodes (only electrodes EL_1, EL_2, EL_3, EL_4, EL_5, and EL_6 are symbolized for explaining). The electrodes are disposed in or on the flexible material FM_1, FM_2. The Flexible material FM_1, FM_2 can be conductive fabric or soft glue, or any other material which can reach the same function.

The electrodes of the first sensing region SR_1 and the second sensing region SR_2 are deformable after provided on the flexible material FM_1, FM_2. Specifically, the shapes of the flexible material FM_1, FM_2 are changeable, thus shapes of the electrodes on or in the first sensing region SR_1 and the second sensing region SR_2 are correspondingly changeable.

The HOD device provided by the present invention further comprises a capacitance detection circuit 201, which is configured to sense capacitance caused by the electrodes. As above-mentioned, the capacitance is used for detecting if a hand is away from the HOD device for a predetermined distance. The predetermined distance can be 0 or larger than 0.

Figure 3:
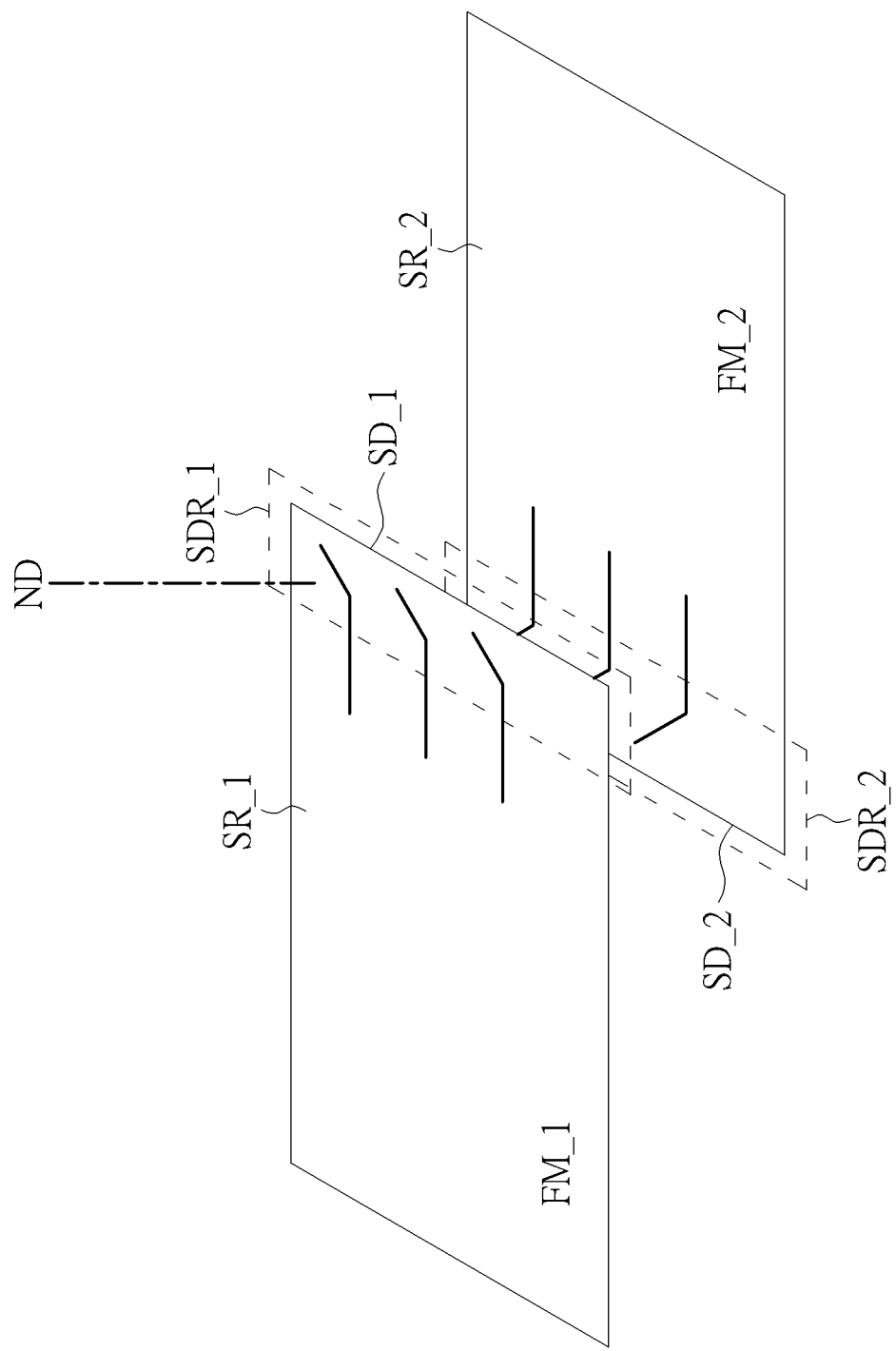
Figure 4:
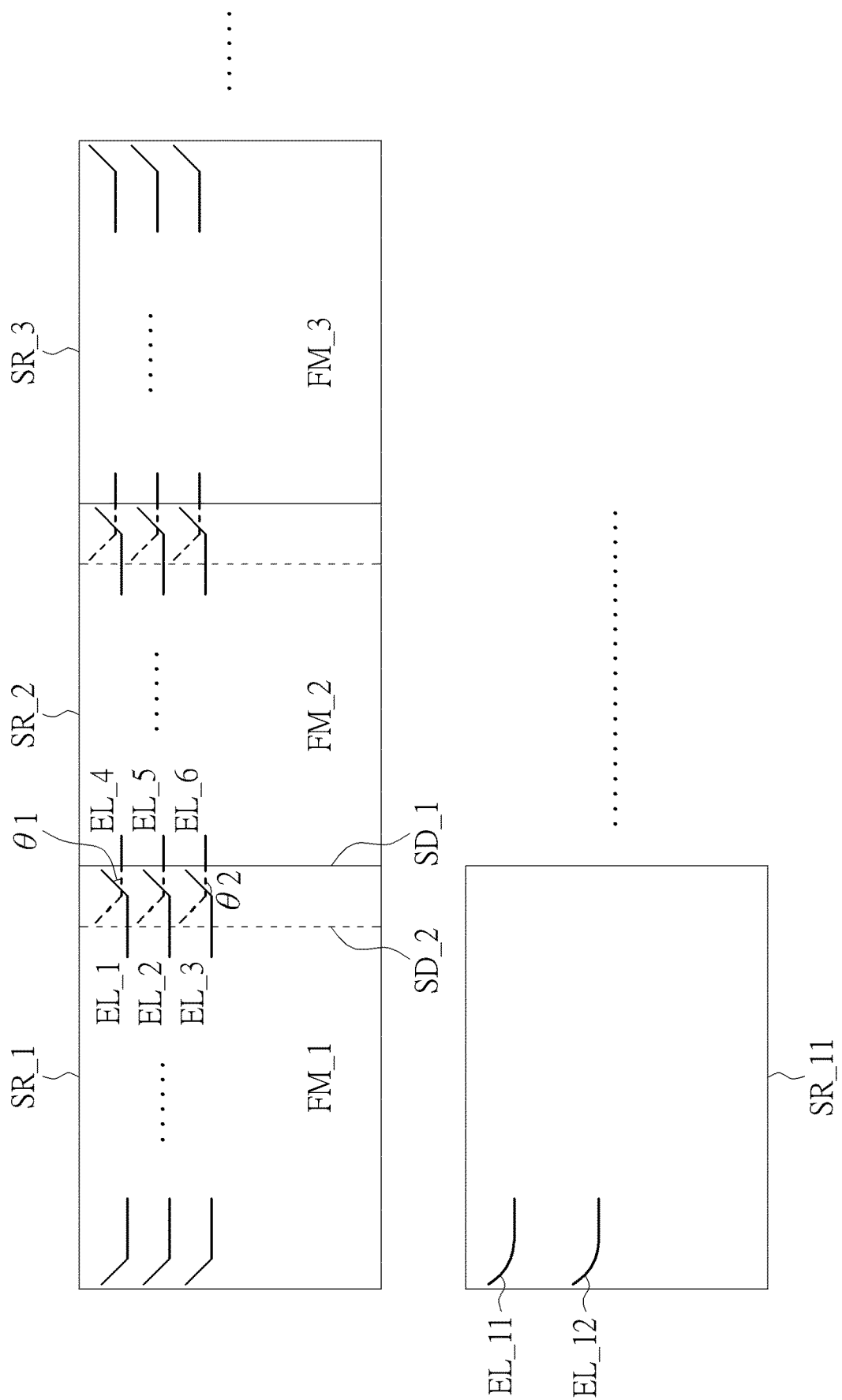

In the embodiment of FIG. 2, for the convenience of illustrating, the sensing regions are independent and not electrically connected with each other. However, for practical usage, the sensing regions are electrically connected to form the flexible capacitive touch sensing device 105. FIG. 3 and FIG. 4 are schematic diagrams illustrating the sensing regions which are electrically connected. Specifically, FIG. 3 is a schematic diagram illustrating a situation that the first sensing region SR_1 and the second sensing region SR_2 are to be electrically connected but not electrically connected yet. FIG. 4 is a schematic diagram illustrating a situation that the first sensing region SR_1 and the second sensing region SR_2 are already electrically connected. Please note, in FIG. 4, the second side SD_2 and the electrodes EL_4, EL_5, EL_6 are shown by dotted lines since they are below the first sensing region SR_1. Besides, in FIG. 4, the electrodes EL_1, EL_2, EL_3, EL_4, EL_5, EL_6 of the first sensing region SR_1 and the second sensing region SR_2 are electrically connected via conductive material or conductive components. Additionally, in FIG. 4, flexible material FM_1, FM_2 can be glued together with adhesive.

Details of FIG. 2, FIG. 3, FIG. 4 and FIG. 5 will be described as below. Please refer to FIG. 2 again, in FIG. 2, the first sensing region SR_1 comprises a first side region SDR_1, and the second sensing SR_2 region comprises a second side region SDR_2. The first side region SDR_1 comprises a first side SD_1 and the second side region SDR_2 comprises a second side SD_2. Based on FIG. 3 and FIG. 4, the electrodes of the first side region SR_1 and the second side region SR_2 are overlapped in normal directions ND of the first side region SDR_1 and the second side region SDR_2. Also, based on FIG. 4, the first side SD_1 is adjacent to the second side SD_2 when the first sensing region SR_1 and the second sensing region SR_2 are electrically connected. Additionally, based on FIG. 4, an angle which is not 0° exists between the electrodes which are overlapped. For example, an angle θ1 exists between the electrodes EL_1, EL_4, and an angle θ2 exists between the electrodes EL_3, EL_6.

In other words, based on FIG. 1, FIG. 2, FIG. 3 and FIG. 4, the first sensing region SR_1 and the second sensing region SR_2 respectively comprises a buffering region (e.g., the side region SDR_1, SDR_2). At least one of the electrodes in the buffering region has a bended portion. The bended portion has a bended angle, which can be set corresponding to different requirements. As shown in FIG. 1, a bended angle θa of the electrode with the bended portion is from 0°-45°.

In one embodiment, the electrode can have a curved portion. Please replace to FIG. 4 again. In the lower diagram of FIG. 4, the electrodes EL_11, EL_12 in the sensing region SR_11 have curved portions. Specifically, the bended portion has a sharp angle. Also, the curved portion has no sharp angle. In summary, the electrode can have a non-linear shape, such as a bended portion or a curved portion.

Figure 5:
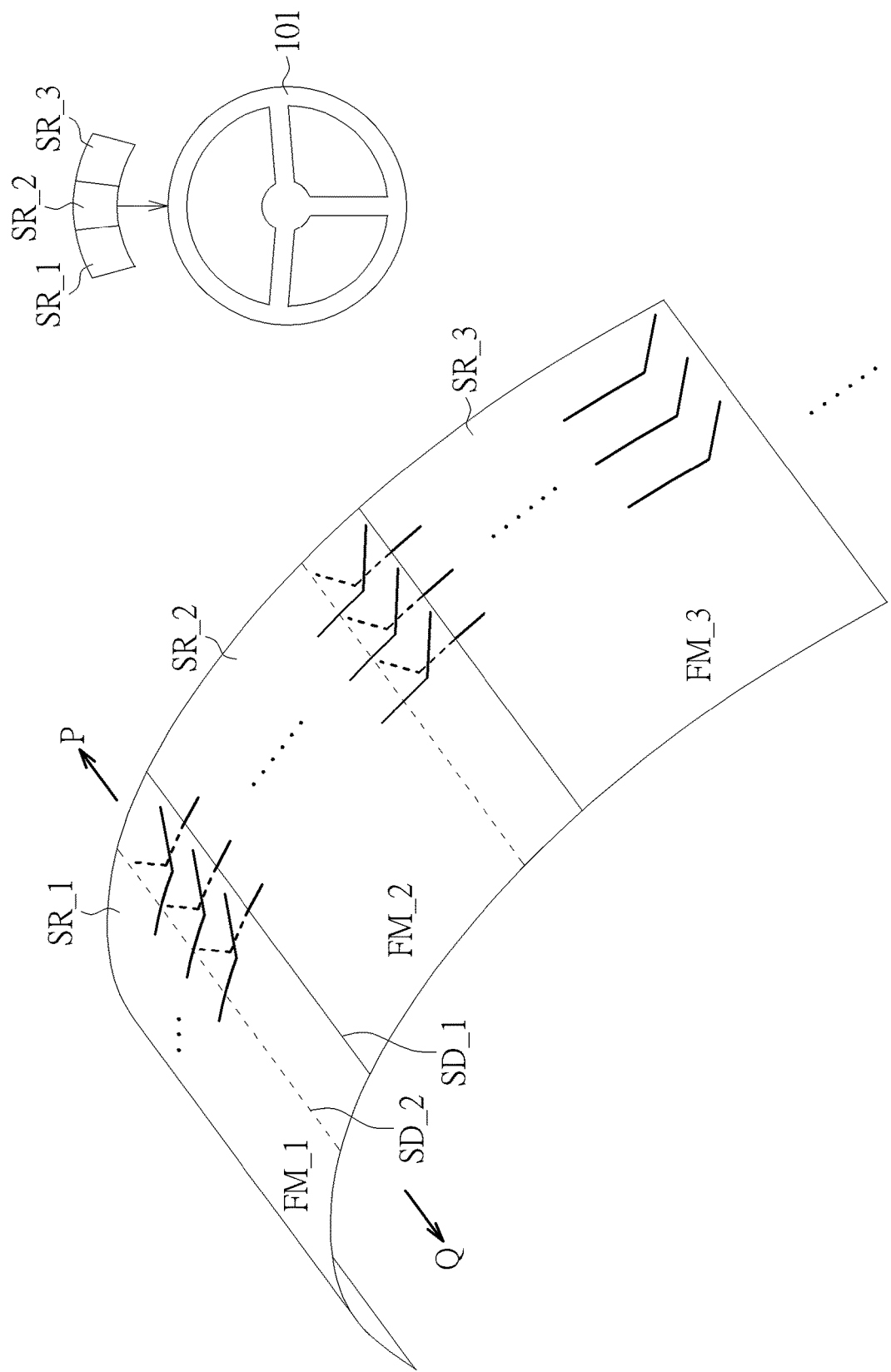

FIG. 5 is a schematic diagram illustrating a flexible capacitive touch sensing device, which is bent. As shown in FIG. 5, the electrodes EL_1, EL_2, EL_3, EL_4, EL_5, EL_6 of the first sensing region SR_1 and the second sensing region SR_2 are bent since the flexible material FM_1, FM_2 are bent along the steering wheel, but still keep electrically connected to each other via the bended portion when the sensing regions are bent. Please note, when the sensing regions are provided on an object, besides the deformation illustrated in FIG. 5, the sensing regions may further have other deformations corresponding to the shape of the object. For example, as shown in the top right portion of FIG. 5, if the first sensing region SR_1, the second sensing region SR_2 and the third sensing region SR_3 are provided on \the frame work 101, the first sensing region SR_1, the second sensing region SR_2 and the third sensing region SR_3 may have deformation following the directions of P and Q, in order to surround the steering wheel 101.

Figure 6:
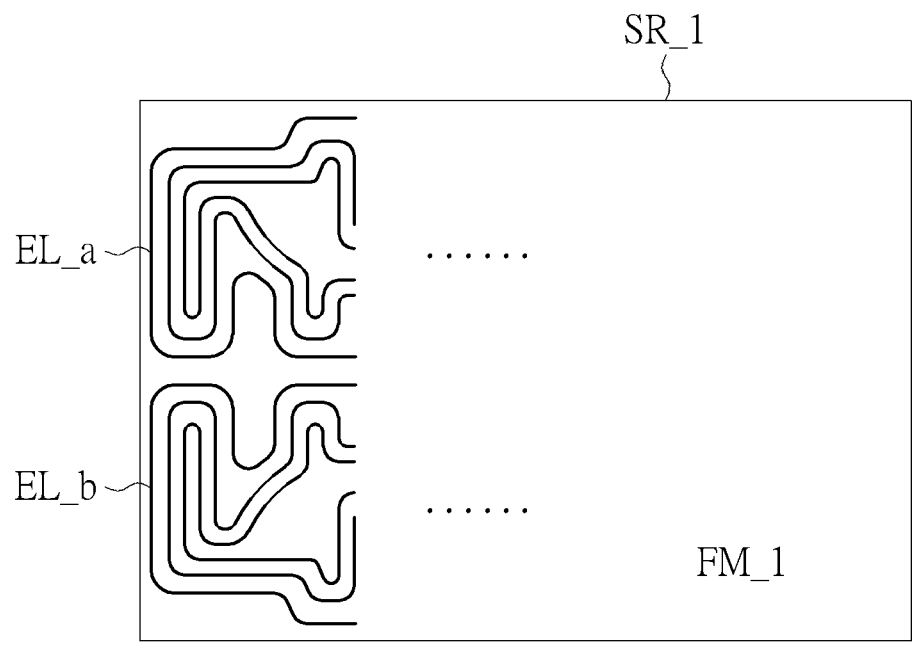
FIG. 6 is a schematic diagram illustrating arrangements of electrodes according to another embodiment of the present invention.
Figure 6:
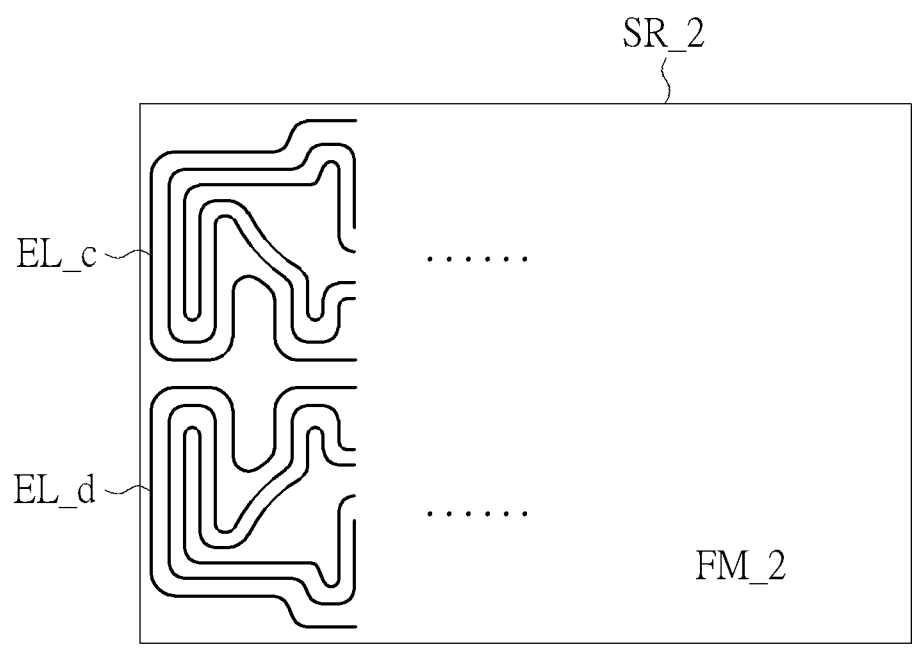

The shapes of the electrodes are not limited to the shapes illustrated in the above-mentioned embodiments. For example, FIG. 6 is a schematic diagram illustrating electrodes with another arrangement. In the embodiment of FIG. 6, the electrodes EL_a, EL_b, EL_c and EL_d have different shapes with which illustrated in FIG. 2, FIG. 3, FIG. 4 and FIG. 5, but still have the same characteristics. That is, an angle which is not 0° exists between the electrodes which are overlapped. Also, at least one of the electrodes in the buffering region has a bended portion, and a bended angle of the electrode with the bended portion is from 0°-45°.

The arrangements of the electrodes can be set, corresponding to whether the flexible capacitive touch sensing device is a self-capacitance touch sensing device or a mutual capacitance touch sensing device. Details about the self-capacitance touch sensing device and the mutual capacitance touch sensing device are well known by persons skilled in the art. For example, a US patent with a patent number of U.S. Pat. No. 9,684,418 clearly states the structures the self-capacitance touch sensing device and the mutual capacitance touch sensing device, thus descriptions thereof are omitted for brevity here.

Besides the above-mentioned structure, the HOD device provided by the present invention can comprise other layers.

Figure 7:
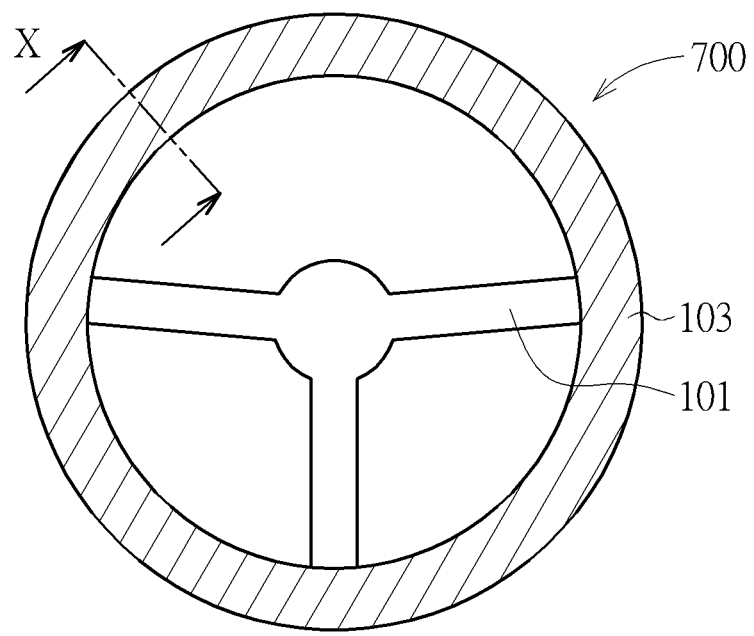
FIG. 7 and FIG. 8 are schematic diagrams illustrating a steering wheel according to another embodiment of the present invention.
Figure 7:
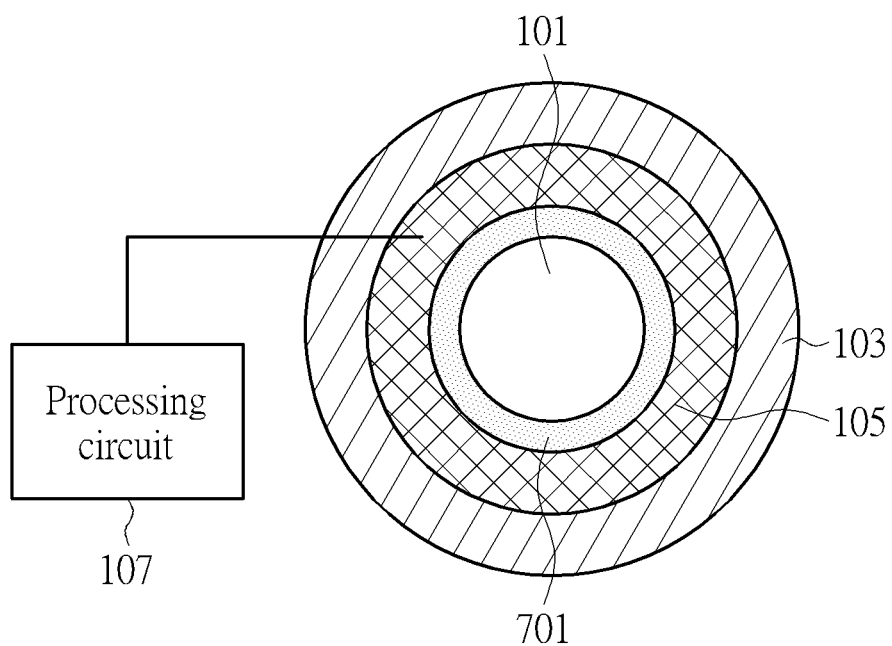

For example, FIG. 7 is a schematic diagram illustrating a steering wheel according to another embodiment of the present invention. The lower diagram of FIG. 7 is a cross-sectional diagram of the upper diagram thereof, following the X direction. As shown in FIG. 7, besides the frame work 101, the covering material 103, and the flexible capacitive touch sensing device 105 illustrated in FIG. 1, the steering wheel 700 further comprises a reference layer 701. The reference layer 701 is located below the above-mentioned first sensing region SR_1 and the second sensing region SR_2, and above the framework 101. In other words, the reference layer 701 is surrounding the frame work 101 and the flexible capacitive touch sensing device 105 is surrounding the reference layer 701, as illustrated in a lower diagram of FIG. 7.

The reference layer 701 is configured to provide a reference voltage level to the electrodes of the sensing regions, such that the capacitance detection circuit 201 can compute capacitance of the electrodes referring to the reference voltage level. For example, the reference layer 701 is configured to provide a ground voltage level to the electrodes for reference. Also, the reference layer 701 can provide the function of active shielding, which can reduce the noise while the capacitance detection circuit 201 computing capacitance. In one embodiment, the reference layer 701 is coupled to a ground source provided in a vehicle comprising the steering wheel 700. All devices in the vehicle are coupled to the ground source. In another embodiment, the reference layer 701 further comprises a heating circuit, which can heat the steering wheel 700, such that the user can feel more comfortable while driving a cold weather.

Figure 8:
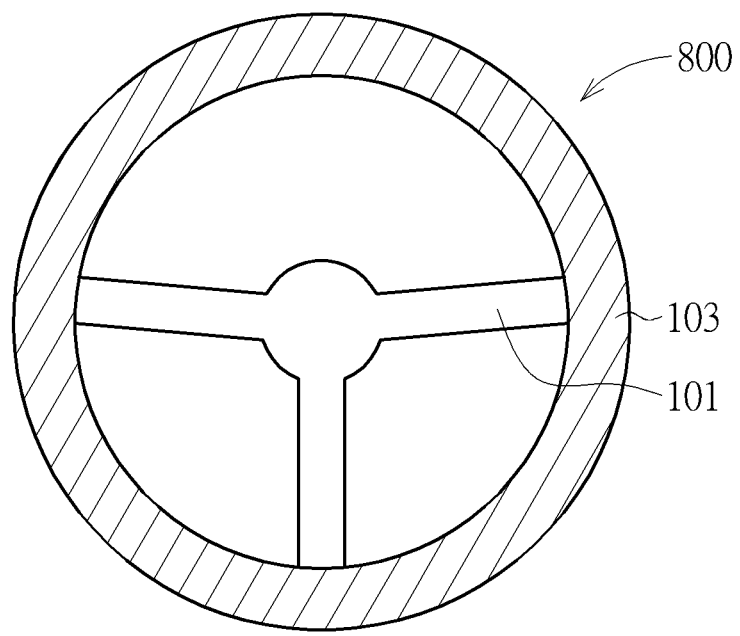
Figure 8:
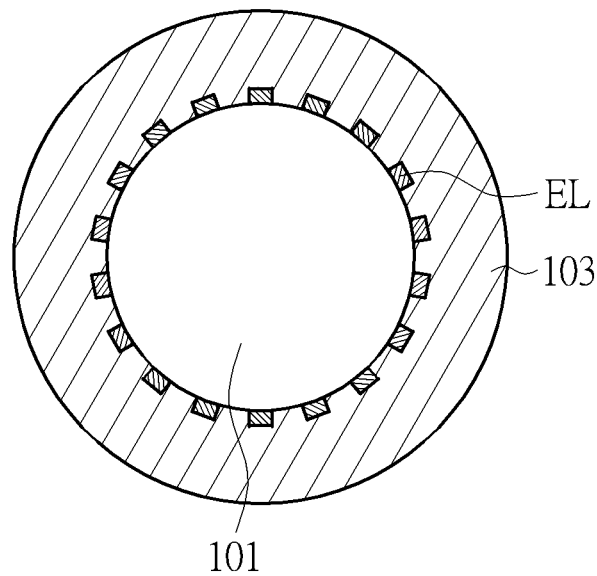

The above-mentioned electrodes are not limited to be provided in or on the flexible material. FIG. 8 is a schematic diagram illustrating a steering wheel according to another embodiment of the present invention. The lower diagram of FIG. 8 is a cross-sectional diagram of the upper diagram thereof, following the X direction. As shown in FIG. 8, the steering wheel 800 comprises a frame work 101, and covering material 103. However, the electrodes EL in the embodiment of FIG. 8 are printed on or in the covering material 103 rather than the above-mentioned flexible material. Therefore, in the embodiment of FIG. 8, the covering material 103 is surrounding the frame work 101 and the electrodes EL are provided between the frame work 101 and the covering material 103. The arrangements of the electrodes EL in FIG. 8 can follow the above-mentioned embodiments, thus are omitted for brevity here.

In view of above-mentioned embodiments, the numbers of the sensing regions which are combined to form the flexible capacitive touch sensing device can be changed corresponding to the size of the frame work or any other requirements, thus the issues for the conventional steering wheel can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flexible capacitive touch sensing device, comprising:
a first sensing region and a second sensing region, each of the first sensing region and the second sensing region comprising:
flexible material; and
a plurality of electrodes, disposed in or on the flexible material, wherein the electrodes of the first sensing region and the second sensing region are electrically connected via conductive material or conductive components; and
a capacitance detection circuit, configured to sense capacitance caused by the electrodes, wherein the capacitance is used for detecting if an object causes capacitance variation to at least one of the first sensing region and the second sensing region;
wherein the first sensing region comprises a first side region with a first side, and the second sensing region comprises a second side region, wherein the first side is adjacent to the second side;
wherein shapes of the electrodes of the first sensing region and the second sensing region are changeable after provided on the flexible material;
wherein the electrodes of the first side region and the second side region are overlapped in normal directions of the first side region and the second side region;
wherein an angle which is not 0° exists between the electrodes which are overlapped.

2. The flexible capacitive touch control device of claim 1, wherein each one of the first sensing region and the second sensing region comprises a buffering region, wherein at least one of the electrodes in the buffering region has a bended portion;
wherein the electrodes of the first sensing region and the second sensing region can still be electrically connected via the bended portion when the first sensing region and the second sensing region are bent.

3. The flexible capacitive touch control device of claim 2, wherein a bended angle of the electrode with the bended portion is from 0°-45°.

4. The flexible capacitive touch sensing device of claim 1, further comprising:
a reference layer, below the first sensing region and the second sensing region, configured to provide a reference voltage level to the electrodes.

5. The flexible capacitive touch sensing device of claim 4, further comprising:
a heating circuit, provided in the reference layer.

6. The flexible capacitive touch sensing device of claim 1, wherein the flexible material is conductive fabric or soft glue.

7. A Hand Off Detection (HOD) device comprising:
covering material;
a framework;
a flexible capacitive touch sensing device, provided between the covering material and the frame work, comprising:
a first sensing region and a second sensing region, each of the first sensing region and the second sensing region comprising:
flexible material; and
a plurality of electrodes, disposed in or on the flexible material, wherein the electrodes of the first sensing region and the second sensing region are electrically connected via conductive material or conductive components; and
a capacitance detection circuit, configured to sense capacitance caused by the electrodes, wherein the capacitance is used for detecting if a hand is away from the HOD device for a predetermined distance;
wherein the first sensing region comprises a first side region with a first side, and the second sensing region comprises a second side region with a second side, wherein the firs side is adjacent to the second side;

wherein shapes of the electrodes of the first sensing region and the second sensing region are changeable after provided on the flexible material;

wherein the electrodes of the first side region and the second side region are overlapped in normal directions of the first side region and the second side region;

wherein an angle which is not 0° exists between the electrodes which are overlapped.

8. The HOD detection device of claim 7, wherein each one of the first sensing region and the second sensing region comprisesa buffering region, wherein at least one of the electrodes in the buffering region has a bended portion;

wherein the electrodes of the first sensing region and the second sensing region can still keep electrically connected to each other via the bended portion when the first sensing region and the second sensing region are bent.

9. The HOD detection device of claim 8, wherein a bended angle of the electrode with the bended portion is from 0°-45°.

10. The HOD device of claim 7, further comprising:

a reference layer, located below the first sensing region and the second sensing region, and above the framework, configured to provide a reference voltage level to the electrodes.

11. The HOD device of claim 7, further comprising:

a heating circuit, provided in the reference layer.

12. The HOD device of claim 7, wherein the HOD device is a vehicle control device.

13. The HOD device of claim 12, wherein the HOD device is a steering wheel.

14. A Hand Off Detection (HOD) device, comprising:

covering material;

a framework;

a flexible capacitive touch sensing device, provided between the covering material and the frame work, comprising:

a first sensing region and a second sensing region, each of the first sensing region and the second sensing region comprising:

a plurality of electrodes, printed on or in the covering material, wherein the electrodes of the first sensing region and the second sensing region are electrically connected via conductive material or conductive components; and a capacitance detection circuit, configured to sense capacitance caused by the electrodes, wherein the capacitance is used for detecting if a hand is away from the HOD device for a predetermined distance;

wherein the first sensing region comprises a first side region with a first side, and the second sensing region comprises a second side region with a second side, wherein the firs side is adjacent to the second side;

wherein shapes of the electrodes of the first sensing region and the second sensing region are changeable after provided on the covering material;

wherein the electrodes of the first side region and the second side region are overlapped in normal directions of the first side region and the second side region;

wherein an angle which is not 0° exists between the electrodes which are overlapped.

15. The HOD device of claim 14, further comprising:

a reference layer, located below the first sensing region and the second sensing region, and above the framework, configured to provide a reference voltage level to the electrodes.

16. The HOD device of claim 14, further comprising:

a heating circuit, provided in the reference layer.

17. The HOD device of claim 14, wherein the HOD device is a vehicle control device.

18. The HOD device of claim 17, wherein the HOD device is a steering wheel.

* * * * *